Patented Oct. 2, 1928.

1,686,206

UNITED STATES PATENT OFFICE.

HENNING GUSTAV FLODIN, OF ROSLAGS-NASBY, AND EMIL GUSTAF TORVALD GUSTAFSSON, OF STOCKHOLM, SWEDEN.

METHOD OF PRODUCING METALS OR METAL ALLOYS LOW IN CARBON DIRECTLY OUT OF ORE OR THE LIKE.

No Drawing. Application filed December 17, 1924, Serial No. 756,557, and in Sweden January 12, 1924.

The present invention refers to a method of producing metals or metal alloys low in carbon in an electric furnace, directly out of oxide ores or other materials containing metal oxides. The method is especially adapted for producing iron and steel but, however, is also suitable for the manufacture of other carbon-binding metals low in carbon, and of alloys thereof, directly out of ores or the like containing such metals.

It has already been proposed to produce metals by mixing finely divided ore and finely divided carbon or other reducing agents, the mixture being then, if desired, on coking or briquetting thereof, molten in a blast furnace, a reverberating furnace, or an electric furnace. This method, however, in practical working, with the use of carbon as a reducing agent, never yielded iron or other carbon-binding metal with a low percentage of carbon, with the degree of certainty required in regular working.

The principal object of the present invention is to provide a method of the type described which, with the degree of certainty required for industrial working, permits the production of low carbon iron, steel or alloys thereof as well as of other carbon-binding metals or alloys having a low carbon content directly from their oxide ores with the use of carbon or carbonaceous material as reducing agent alone or together with other reducing agent.

To this end the invention consists essentially in mixing intimately finely divided ore, finely divided carbonaceous material of a quantity proportioned to the reduction of the ore and to the desired percentage of carbon in the product, and a binding agent, forming the mixture into desired shape, for instance by briquetting to lumps or blocks, solidifying the bodies thus obtained so as to effect fixing of the positions of the ore and carbon particles with relation to one another, feeding said solidified bodies into an electric furnace repeatedly in quantities required for an even reduction and a regular operation of the process, and reducing and melting same whilst floating on the top of the slag bath.

The electric furnace used should preferably be of a type having one or more electrodes directed against the bath in the furnace and permitting, consequently, development of heat due to electric resistance in the slag.

In every portion of the charge, the reducing carbon required for every particle of the ore is to be found immediately adjacent the latter, and besides, the particles are rigidly connected with one another. Consequently, as there cannot be any separation of the ore and carbon particles, the conditions are fulfilled for attaining a nearly complete consumption of the carbon, provided, on the one hand, that the quantity of carbon is properly adapted, and, on the other hand, that the operation of the electric furnace is conducted in such a manner that no considerable quantity of carbon will be absorbed from the electrodes either during the melting or thereafter, in cases where the said electrodes consist of carbon.

If the reducing carbon is admixed in a solid state, for instance, in the form of charcoal, pit-coal, anthracite, coke, or the like, the desired property of the charge, that is to say the property of the mutual positions of the ore and carbon particles of the charge being fixed, may be attained by the addition of one or more suitable binding agents in a liquid state. The binding agent should, of course, be of such a nature that the effect thereof of keeping the particles together will not cease under the conditions prevailing in the reduction furnace or in the charging devices thereof. Suitable liquid binding agents are, for instance, a solution of water-glass, lime-white, molasses, sulphite waste liquor or the like, which agents are adapted to cement the different materials rigidly onto each other. On using such a liquid binding agent the drying process is preferably performed at such a temperature that the binding agent becomes solid due to the expulsion of water and keeps the particles together. Evidently, only such substances should be used as binding agents that do not impair the quality of the metal produced, and that may be readily slagged, or are otherwise consumed during the process of reduction.

When a portion of the reducing carbon required for the reduction is admixed in the form of liquid carbonaceous substance, such as tar or oil, asphalt, peat, sulphite waste liquor, or molasses, or the like, the mixture of such material and ore is preferably dried in air or some other suitable atmosphere, so that the carbonaceous substance is solidified and keeps the particles together at the drying temperature used. In such case a portion of the carbonaceous material serves as a binding agent, so that a special binding agent may be dispensed with. The carbon content of said carbonaceous binding material will, of course, take part in the reduction, and, consequently, in calculating the amount of reducing agent to be admixed regard should be paid to the content of effective carbon in said binding material. The drying process must not, however, be carried out at so high a temperature that distillation or coking of the carbonaceous substance sets in to any considerable degree, for otherwise an uneven distribution of the carbon in the charge will very easily be obtained. The most suitable of the above mentioned liquid carbonaceous substances, are those that are liquid by reason of the water contents thereof. In drying, which is to be carried out up to 100–250 degrees. the water escapes, and the remaining dry substance then forms an effective binding agent, this being also the case at higher temperatures and under such conditions as are prevalent in the furnace chamber when the charge is introduced. If vacuum is used in the drying process, a corresponding lower temperature may be used. By the drying process, which may be effected during the mixing, or, after the same, (no complete drying must, of course be permitted, before a really intimate mixture has been attained), the charge is formed into larger and smaller pieces or lumps, varying in size from that of a grape up to coherent cakes, depending on the arrangement of the drying apparatus. If larger pieces are formed, these should, preferably, be disintegrated to smaller pieces of a suitable size before they are introduced into the furnace. Obviously, some powder will be produced in the disintegrating operation as well as in the drying process. However, as the number of particles always remains comparatively small, this formation of powder has practically no influence on the composition of the final product.

The smaller the size of the grains of the ore and particles of the reducing carbon before the mixing and drying, that is to say the more the size of the grains approaches the molecular size the better is the method effected. If the size of the grains selected is comparatively large, the conversion between the ore and the carbon will be more incomplete and, consequently, the recovery of metal inferior. Likewise, the conversion is apt to be more uncertain so that it will not be possible beforehand to say which will be the percentage of carbon in the final product. According to the invention the size of the grains of the ore and the carbon should, when the latter is admixed in a solid state, be such that 75% at least of the grains will pass through a sieve having 200 meshes per square centimeter.

As mentioned above, the feeding of the charge into the electric furnace should, according to the invention, take place practically continuously or repeatedly in quantities required for an even reduction and a regular operation of the process. By the latter expression is meant that the charge should be introduced into the furnace in relatively small portions, so that great quantities of charge are not fed into the furnace at one time. The smaller the portions are, that is to say the more continuous the introduction of the charge, the better and more even the process and the greater the production. If large portions of charge are fed into the furnace at one time, interruptions of working will easily set in on account of the violent development of gas, and furthermore the temperature within the furnace will vary, causing an uneven operation of the furnace.

The feeding should, preferably, be interrupted a suitable time before the metal is tapped, in order to give the material last introduced a sufficient time for reduction. The reduction takes place very quickly with the fine division of the material, and for this reason the said interruptions of feeding at the tappings will not materially influence the production. When in the tapping only a portion of the metal obtained is being tapped, feeding may also take place during tapping. The charge is preferably supplied to the melting chamber of the furnace through one or more charging shafts, through which, preferably, the gases produced on reduction are also caused to escape, whereby preheating of the charge is effected before it enters the smelting chamber. The gases which, for the most part, consist of carbon monoxide, are preferably collected and utilized in known manner, for instance for heating or reducing purposes. From the shafts the charge may be distributed over as large a portion of the surface of the bath in the furnace as possible, this being preferably effected in such a manner that the charge is not brought into contact with the electrodes should the latter consist of carbonaceous material, as otherwise carbon from the said electrodes will be readily absorbed by the metal, besides which the consumption of electrodes is increased.

In the use of reducing carbon containing sulphur to a considerable extent, the addition of lime-white, either alone or in combination with other additional substances, brings about the additional advantage, that the thin film of lime forming about or on the carbon—or ore particles, on reduction, binds a larger or smaller portion of this sulphur as sulphide of calcium which is absorbed in melting by the slag produced, and is thus rendered harmless. A larger or smaller portion of the sulphur contents of the ore may also be rendered harmless in this way. For the binding of sulphur, lime or other materials containing oxides of the light metals or other alkaline earth metals, such as oxide of barium, may also be used in some other state as an addition in mixing the charge, provided the requisite small quantity of such material may be sufficiently uniformly distributed throughout the whole mass. If the reducing carbon contains a considerable amount of sulphur, the lime or the like may, of course, be added only to the carbon before it is admixed with the ore and the binding agent that may be used in connection therewith.

As already mentioned, the charge admixed with suitable additional substances may be dried in such a manner that it will be obtained in the form of lumps or pieces, the different materials in the same being rigidly connected with each other. This property may also be imparted to the charge by forming or pressing the same to briquettes or the like and by subsequently drying or hardening the same in air or other suitable atmosphere, at the ordinary or at an increased temperature, according to the admixtures used. In most cases briquetting will be found superfluous, but in certain instances it may be advantageous. If, namely, the briquetting is effected when the mixture is warm, the layer of air on each particle of the finely divided material will be much thinner and, consequently, the adhesion between the particles will be considerably greater after pressing or the like.

Thus, if in such a charge in the form of briquettes or other pieces that have been preliminarily treated in the manner set forth, the particles of the ore and those of the reducing agent are distributed in the charge as uniformly as possible, and rigidly connected with each other, this charge is introduced into an electric furnace either continuously or repeatedly in quantities required for an even reduction and a regular operation of the process, an iron, steel or metal having a content of carbon adapted to the total amount of carbon contained in the charge will, under otherwise proper working conditions, be obtained from the furnace. It has been found very easy to manufacture, according to the present method, iron having a percentage of carbon as low as 0,02, that is to say, iron which is practically free from carbon.

The charge on introduction into the smelting chamber of the electric furnace floats in the slag produced until the reduction is nearly completed, owing to its content of dry carbonaceous material and its porous state which give it a smaller specific weight than that of the slag, provided that the feeding the charge is regulated in such a manner, that the charge layer on the slag does not become too thick. By suitable admixture, the specific weight of the slag may also, if required, be increased, so that the charge will not sink down into the slag bath before completion of the reduction. If the charge sinks too soon, the same will burst on account of the violent development of gas, which will impair the intimate contact between the ore particles and the particles of the reducing agent. If a great part of the reduction is completed within the slag bath, the slag will swell and, in some cases, fill the whole smelting room of the furnace, thereby rendering the operation of the furnace very difficult to regulate.

The admixture of a slag-forming material to slag the gangue of the ore or any residue from the reducing carbon and any binding agent may take place either in mixing the constituents of the charge, or preferably, directly in the electric furnace in the process of melting, or, in both of these stages of the method. The admixture directly into the furnace entails the advantage that the flux will not be lying mixed with the particles of the ore and the carbon, and for this reason a more intimate contact between these two materials will be obtained in this case. Besides, a smaller amount of binding agent will be required. In the latter case the slagging of the gangue etc. will take place on the reduced metal particles sinking down through the slag bath.

In producing iron and steel according to the method forming the subject of the present invention, the product may sometimes obtain a somewhat uneven percentage of carbon, and the same may also contain a considerable amount of oxides, for instance ferrous oxide. The variations may, on the one hand, depend on the nature of the ore and the reducing carbon used, and, on the other hand, on the operation of the furnace. If the iron or the steel contains a large amount of oxides, the product cannot always be directly used as so-called commercial iron and, above all, not directly as iron of high quality, without preceding admixture of a deoxidizing agent, or preceding refining or other treatment. As a rule, however, it is more advantageous to manufacture the iron, steel or metal in the reduction furnace, without paying particular regard to the final quality, and to effect the subsequent requisite treatment in another furnace, if this will be found necessary on account of the required character and quantity of the iron or metal. The first furnace may then be operated under the conditions that are most favourable for the reduction, while utilizing the electric energy and the reduction furnace itself as far as possible, whereas in the second furnace, which may be of any type, for instance, an open hearth furnace, a Bessemer converter or, preferably, an electric furnace, the final quality of the product may be established under the conditions most favourable for the subsequent treatment. Thus, the percentages of carbon and other alloying substances in the iron or metal, such as silicon, manganese, chrome, nickel etc., may be regulated or adjusted in the second furnace, for instance by decarbonizing in order to reduce a somewhat too high percentage of carbon, by refining, in order to reduce the amount of alloying substances absorbed from the ore and any admixture, or, by the addition of carbon or other alloying substances, or by dephosphorizing or desulphurizing. Obviously, a plurality of furnaces may also be used in succession for the subsequent treatment.

When steel is to be produced with a percentage of carbon of about 0.10, and in using an ore or a carbonaceous material rich in phosphorus, this will succeed directly according to the method forming the object of the present invention without the percentage of phosphorous becoming too high if a suitable admixture of lime is made in the charge or in the furnace, so that a suitable slag is obtained which is rich in lime and adapted to bind the phosphorus in the form of phosphates. By using a slag rich in lime, and although using raw materials containing sulphur in considerable quantities, the sulphur will be taken up in the slag to a considerable extent.

If the composition of the core is such that it is found difficult to drive the phosphorus into the slag, for instance by reason of a high percentage of silicic acid, it is more suitable to produce, in the first furnace, a steel which is rich in phosphorus and which is then, in the second furnace, liberated from phosphorus, with the aid of a suitable, basic slag which is rich in lime. When the percentage of phosphorus in the steel is high, a slag is obtained in the second furnace which is very rich in phosphorus, and which is adopted, after being powdered, to be used as fertilizer or the like, with very good results. The latter furnace may then, preferably, consist of a Bessemer converter, the removal of the phosphorus from the metal being effected very rapidly. However, other types of furnaces may also be used.

If iron or steel is to be produced, which, intentionally, is not rich in oxides, such as scrap iron to be used in the open hearth furnace, deoxidizing agents, such as ferro-silicon, ferro-manganese, ferro-manganese-silicon, ferro-aluminum-silicon, aluminium or the like may be added to the steel, after an adequate quantity of charge has been reduced and melted. The deoxidizing agent is then added either in a solid state, cooled or preheated, or in a molten state. The admixture may in each particular case be effected at the most suitable stage of the process, for instance in one of the furnaces, in the tapping channels thereof, in the ladle and/or in a mixer after the reduction furnace, or in the ladle after the second furnace, when a second furnace is used.

By admixing with the charge during the preparation of suitable ore or ores, for instance quartz or other materials rich in silicic acid, manganiferous ores, chrome ores, vanadium ores or the like, together with finely divided reducing agent for the reduction of said ore or ores so-called alloyed-iron or alloyed steel may be produced directly, according to the present method, inasmuch as ores of metals difficult to reduce are very easily reduced according to this method without the absorption of carbon being appreciable. By the addition of chrome ore, alloyed iron or alloyed steel may be produced directly in this way, which iron or steel respectively may be used as so-called rustless iron or rustless steel. The addition of alloying substances, which is rather expensive when such admixture is effected in the form of ferro-alloys of the metals, particularly when alloys low in carbon must be used, may in this way take place at a comparatively low cost.

Ferro-alloys which are low in carbon, such as ferro-manganese, ferro-chromium, ferro-tungsten, ferro-vanadium etc., may also be advantageously produced according to the present invention, the iron ore in the mixture being then, wholly or partly, replaced by an ore containing the metal desired in the iron. In reducing chrome ore, for instance, we have succeeded in obtaining directly by the present method, ferro-chromium with a percentage of carbon not exceeding 0,10.

In the following an illustrative example will be given of the manner in which the invention may be practiced for producing low carbon iron and steel.

Briquettes were prepared from a mixture of the following composition:

| | Parts by weight. |
|---|---|
| Iron ore concentrate with 62% Fe | 470 |
| Charcoal 108–132 medium | 117 |
| Burnt lime used as lime white 60–65 medium | 61 |

The electric furnace used had a capacity of 3000 kilowatts and was provided with three vertical star-connected carbon electrodes adapted to be raised and lowered by automatic regulators and with two lateral feeding stacks each having two screw conveyors for the introduction of the charge. Briquettes of the above composition were fed into this furnace practically continuously and reduced and melted therein whilst floating in a thin layer on top of the slag bath.

The smelting proceeded very evenly and quietly, and the irons obtained in the different tappings were of extraordinarily high quality, especially regarding the freedom from gas and brittleness. The content of carbon in the products was regulated by proportioning the carbon content in the briquettes. Thus irons and steels having a carbon content of, for instance, 0.07, 0.20, 0.45, 1.08% C. were obtained. The comsumption of power and electrodes was very low, especially in view of the high quality of the products produced.

The method according to the present invention offers a number of advantages. Finely divided ores, e. g., concentrates or the like, whch otherwise cannot be used on a larger scale without a preceding, comparatively expensive briquetting process, together with burning or sintering, may be thus directly reduced and obtained as a marketable product. Above all, however, the advantage is gained that a malleable ingot iron or steel may be produced for many purposes directly, with the avoidance of the roundabout way involved by the blast furnace process, which iron or steel, particularly on the addition of deoxidizing agents, is able to compete directly with the present cheap iron and steel produced in great quantities. For iron works producing iron of a high quality, the additional advantage is available that a waste which is of a good quality in all respects, and is adapted to be used as an admixture in the open hearth and crucible furnace processes, may be produced directly according to the present method.

The invention is not limited to the materials or substances mentioned hereinbefore by way of example, but comprises all metals and metal alloys having a tendency to absorb carbon.

In the following claims the expression "carbonaceous material" does not only involve such carbonaceous material as tar or oil, asphalt, peat, sulphite waste leach, molasses or the like in a liquid or solid state but also all sorts of carbon, for instance charcoal, pit-coal, anthracite, coke or the like.

Further the expressions "practically continously" and "repeatedly in quantities required for an even reduction and a regular operation of the process" occurring in the claims mean that the charge should be fed into the furnace either continously or in small portions at short intervals so that violent development of gas is prevented, as otherwise the temperature and operation of the furnace would be uneven, jeopardizing the successful performance of the process, if not rendering the same wholly impossible.

What we claim as new and desire to secure by Letters Patent of the United States of America is:—

1. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, forming the mixture into desired shape, solidifying the bodies thus obtained so as to effect fixing of the positions of the ore and carbon particles with relation to one another, feeding said solidified bodies into an electric furnace repeatedly in quantities required for an even reduction and a regular operation of the process and reducing and melting same whilst floating on the top of the slag bath.

2. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, transforming the mixture into lumps or blocks, solidifying said lumps or blocks so as to effect fixing of the position of the ore and carbon particles with relation to one another, feeding said solidified lumps or blocks into an electric furnace repeatedly in quantities required for an even reduction and a regular operation of the process and reducing and melting same whilst floating on the top of the slag bath.

3. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, transforming the mixture into lumps or blocks, solidifying said lumps or blocks by drying same so as to effect fixing of the positions of the ore and carbon particles with relation to one another, feeding said solidified lumps or blocks into an electric furnace repeatedly in quantities required for an even reduction and a regular operation of the process and reducing and melting same whilst floating on the top of the slag bath.

4. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, forming the mixture into desired shape, solidifying the bodies thus obtained so as to effect fixing of the positions of the ore and carbon particles with relation to one another, feeding said solidified bodies practically continuously into an electric furnace, and simultaneously reducing and melting same whilst floating on the top of the slag bath.

5. A method of producing alloyed iron or steel low in carbon directly from ore and the like, consisting in mixing intimately finely divided iron ore, finely divided ore containing the alloy constituent, finely divided carbonaceous material of a quantity proportioned to the reduction of the ores and the desired percentage of carbon in the product, and a binding agent, forming the mixture into desired shape, solidfying the bodies thus obtained so as to effect fixing of the ore and carbon particles with relation to one another, feeding said solidified bodies into an electric furnace repeatedly in quantities required for an even reduction and a regular operation of the process and reducing and melting same whilst floating on the top of the slag bath.

6. A method of producing metals or metal alloys low in carbon directly from ore and the like, consisting in mixing intimately finely divided ore, finely divided carbonaceous material of a quantity proportioned to the reduction of the ore and the desired percentage of carbon in the product, and lime white as a binding agent, forming the mixture into desired shape, solidfying the bodies thus obtained by drying same in an atmosphere containing carbon dioxide so as to effect fixing of the positions of the ore and carbon particles with relation to one another, feeding said solidified bodies into an electric furnace repeatedly in quantities required for an even reduction and a regular operation of the process and reducing and melting same whilst floating on the top of the slag bath.

7. A method of producing metals or metal alloys low in carbon directly from ore and the like rich in phosphorus, consisting in mixing intimately such ore in a finely divided state, finely divided carbonaceous material of a quantity proportioned to the reduction of the ore and the desired percentage of carbon in the product, and a binding agent, forming said mixture into desired shape, solidfying the bodies thus obtained, so as to effect fixing of the positions of the ore and carbon particles with relation to one another, feeding said solidified bodies into an electric furnace repeatedly in quantities required for an even reduction and a regular operation of the process, reducing and melting the bodies whilst floating on the top of the slag bath, adding to the charge during reduction such a quantity of lime that the phosphorus is taken up in the slag, and tapping the metal or metal alloy thus formed.

8. A method of producing metals or metal alloys low in carbon directly from ore and the like, consisting in mixing intimately finely divided ore, finely divided carbonaceous material of a quantity proportioned to the reduction of the ore and the desired percentage of carbon in the product, and a binding agent, forming the mixture into desired shape, solidifying the bodies thus obtained, so as to effect fixing of the positions of the ore and carbon particles with relation to one anther, feeding said solidified bodies into an electric furnace repeatedly in quantities required for an even reduction and a regular operation of the process, reducing and melting same whilst floating on the top of the slag bath, tapping the metal or metal alloy thus formed, introducing said metal into another furnace, finally adjusting the composition of the metal or metal alloy in said other furnace and tapping the metal or metal alloy.

9. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, forming the mixture into desired shape, solidifying the bodies thus obtained so as to effect fixing of the positions of the ore and carbon particles with relation to one another, feeding said solidified bodies practically continuously into an electric furnace, reducing and melting same whilst floating on the top of the slag bath, breaking off the feeding of the bodies and tapping the metal or metal alloy thus formed.

10. A method of producing metals or metal alloys low in carbon directly from ore and the like, consisting in mixing intimately finely divided ore, finely divided carbonaceous material of a quantity proportioned to the reduction of the ore and to the desired percentage of carbon in the product, and a binding agent, forming the mixture into desired shape, solidifying the bodies thus obtained so as to effect fixing of the positions of the ore and carbon particles with relation to one another, feeding said solidified bodies into an electric furnace repeatedly in quantities required for an even reduction and a regular operation of the process and reducing and melting same whilst floating on the top of the slag bath with the heat at least in part developed by electric resistance in the slag.

11. A method of producing rustless iron and steel directly from ore and the like, consisting in mixing intimately finely divided iron ore, finely divided chromic ore, finely divided carbonaceous material of a quantity proportioned to the reduction of the ore and the desired percentage of carbon in the product, and a binding agent, forming the mixture into desired shape, solidifying the bodies thus obtained so as to effect fixing of the ore and carbon particles with relation to one another, feeding said solidified bodies into an eltctric furnace repeatedly in quantities required for an even reduction and a regular operation of the process and reducing and melting same whilst floating on the top of the slag bath.

12. In a direct electric reduction process for metals or metal alloys low in carbon with a charge composed of fine particles of ore and carbonaceous material intimately mixed together with a binding agent and solidified into fixed positions relatively to each other as required for reduction, the step of feeding said charge into the electric furnace repeatedly in quantities required for an even reduction and a regular operation of the process and reducing and melting same whilst floating on top of the slag bath.

13. A method of producing metals or metal alloys low in carbon directly from ore and the like, consisting in mixing intimately finely divided ore, finely divided carbonaceous material and a binding agent, forming the mixture into desired shape, solidifying the bodies thus obtained so as to effect fixing of the positions of the ore and carbon particles with relation to one another, feeding said solidified bodies into an electric furnace repeatedly in quantities required for an even reduction and a regular operation of the process, reducing and melting same whilst floating on top of the slag bath and adding to the furnace a deoxidizing agent after an adequate quantity of bodies has been reduced and melted.

In testimony whereof we affix our signatures.

HENNING GUSTAV FLODIN.
EMIL GUSTAF TORVALD GUSTAFSSON.